_Patented Oct. 30, 1951_  2,573,657

UNITED STATES PATENT OFFICE 2,573,657

NEUTRALIZATION OF THE MINERAL ACID SALTS OF AMINONITROTHIAZOLE

George W. Steahly, Maplewood, Mo., assignor to Monsanto Chemical Company, St. Louis, Mo., a corporation of Delaware No Drawing. Application July 28, 1950, Serial No. 176,536

10 Claims. (Cl. 260—306.8)

This invention relates to aminonitrothiazole; more specifically, this invention relates to an improvement in the process for the neutralization of an aqueous solution of the mineral acid salts of aminonitrothiazole.

Aminonitrothiazole is generally prepared by the nitration of acetylaminothiazole to form acetylaminonitrothiazole. The acetylaminonitrothiazole thus formed is then hydrolyzed with a mineral acid in an aqueous medium. An aqueous solution of the mineral acid salt of aminonitrothiazole is then neutralized with sodium acetate or sodium hydroxide precipitating therefrom aminonitrothiazole. The yields obtained in such a process as heretofore used are exceedingly low.

It is an object of this invention, therefore, to provide an improvement in the process for the neutralization of an aqueous solution of the mineral acid salts of aminonitrothiazole. Further objects will become apparent from a description of the novel process of this invention.

It has now been discovered that the yields of aminonitrothiazole obtained by the neutralization of an aqueous solution of its mineral acid salts, may be significantly increased over that which was heretofore obtainable by utilizing ammonium hydroxide as a neutralizing agent. According to a preferred embodiment of this invention, therefore, ammonium hydroxide is added to an aqueous solution of the mineral acid salt of aminonitrothiazole until the pH of said aqueous solution is greater than about 2.0, thereby precipitating therefrom aminonitrothiazole. The following examples are illustrative of the novel process of this invention:

Example I 65 g. of 2-acetylamino-5-nitrothiazole are dissolved in 175 g. of 100% sulfuric acid and 600 g. of water. The solution is then boiled under reflux conditions for about one hour and then cooled to about 30° C. With continuous agitation and at a temperature of about 5–15° C., 300 g. of a 28% ammonium hydroxide solution are added, precipitating 2-amino-5-nitrothiazole. The pH of the resultant reaction mixture is greater than about 2.0. The 2-amino-5-nitrothiazole is then separated from the reaction medium by filtration, washed with water and dried by heating to a temperature of 60–70° C. Approximately an 85% yield of 2-amino-5-nitrothiazole is obtained having a melting point of 197–198° C.

Example II

The procedure set forth in Example I is repeated utilizing in place of the ammonium hydroxide, 325 g. of sodium acetate. Approximately a 65% yield of 2-amino-5-nitrothiazole is obtained.

Example III

The procedure set forth in Example I is repeated utilizing in place of the ammonium hydroxide, 300 g. of 50% sodium hydroxide solution. Approximately a 28% yield of 2-amino-5-nitrothiazole is obtained.

Example IV 50 g. of the sulfuric acid salt of 2-amino-5-nitrothiazole are dissolved in 450 g. of water. 60–70 g. of 28% ammonium hydroxide solution are then added, precipitating 2-amino-5-nitrothiazole. The pH of the resultant solution is then greater than about 2.0. The 2-amino-5-nitrothiazole is recovered by filtration, washed and dried by heating to a temperature of 60° C. Approximately an 85% yield of 2-amino-5-nitrothiazole is obtained.

Example V 50 g. of the hydrochloric acid salt of 4-amino-5-nitrothiazole are dissolved in 450 g. of water. 15–25 g. of 28% ammonium hydroxide solution are then added, precipitating 4-amino-5-nitrothiazole. The pH of the resultant solution is then about 2.0. The 4-amino-5-nitrothiazole is recovered by filtration, washed and dried by heating to a temperature of 60° C. Approximately an 85% yield of 4-amino-5-nitrothiazole is obtained.

Example VI 50 g. of the hydrochloric acid salt of 2-amino-5-nitrothiazole are dissolved in 450 g. of water. 15–25 g. of 28% ammonium hydroxide solution are then added, precipitating 2-amino-5-nitrothiazole. The pH of the resultant solution is then about 2.0. The 2-amino-5-nitrothiazole is recovered by filtration, washed and dried by heating to a temperature of 60° C. Approximately an 85% yield of 2-amino-5-nitrothiazole is obtained.

In carrying out the novel improved process of this invention, the specific reactants, quantities of reactants and reaction conditions set forth in the preceding examples are subject to substantial variation. For example, this process is applicable to the precipitation of aminonitrothiazole from an aqueous solution of any of its mineral acid salts. Typical of such mineral acids are the sulfuric acid, hydrochloric acid, nitric acid and phosphoric acid salts. Furthermore, the novel process of this invention is applicable to the precipitation of any of the various isomeric aminonitrothiazoles from aqueous solutions of their corresponding mineral acid salts.

The neutralization of the aqueous solution of the mineral acid salt of aminonitrothiazole may be carried out over a wide temperature range, limited only by the freezing point and the boiling point of the solution. Preferably, it is carried out at a temperature in the range of from about 10° to about 90° C.

Best yields of aminonitrothiazole are obtained when the quantity of ammonium hydroxide utilized is sufficient to neutralize all of the mineral acid salt of the aminonitrothiazole present in the aqueous solution. Preferably, the amount added should be sufficient to raise the pH of the solution to at least about 2.0. Quantities in slight excess of this amount have no deleterious effect upon the process. After neutralization and precipitation of the aminonitrothiazole in accordance with the novel process of this invention, the aminonitrothiazole may be recovered from the reaction medium by any method well known to those skilled in the art. A particularly convenient method consists in filtering the aminonitrothiazole therefrom, washing it with water and drying it at an elevated temperature under a reduced pressure.

What is claimed is:

1. In the process for the preparation of aminonitrothiazole by the neutralization of an aqueous solution of its mineral acid salt, the improvement which comprises neutralizing said aqueous solution with ammonium hydroxide.

2. In the process for the preparation of aminonitrothiazole by the neutralization of an aqueous solution of its sulfuric acid salt, the improvement which comprises neutralizing said aqueous solution with ammonium hydroxide.

3. In the process for the preparation of 2-amino-5-nitrothiazole by the neutralization of an aqueous solution of its sulfuric acid salt, the improvement which comprises neutralizing said aqueous solution with ammonium hydroxide.

4. In the process for the preparation of aminonitrothiazole by the neutralization of an aqueous solution of its hydrochloric acid salt, the improvement which comprises neutralizing said aqueous solution with ammonium hydroxide.

5. In the process for the preparation of 2-amino-5-nitrothiazole by the neutralization of an aqueous solution of its hydrochloric acid salt, the improvement which comprises neutralizing said aqueous solution with ammonium hydroxide.

6. In the process for the preparation of aminonitrothiazole by the neutralization of an aqueous solution of its mineral acid salt, the improvement which comprises neutralizing said aqueous solution to a pH greater than about 2.0 by the addition thereto of ammonium hydroxide.

7. In the process for the preparation of aminonitrothiazole by the neutralization of an aqueous solution of its sulfuric acid salt, the improvement which comprises neutralizing said aqueous solution to a pH greater than about 2.0 by the addition thereto of ammonium hydroxide.

8. In the process for the preparation of 2-amino-5-nitrothiazole by the neutralization of an aqueous solution of its sulfuric acid salt, the improvement which comprises neutralizing said aqueous solution to a pH greater than about 2.0 by the addition thereto of ammonium hydroxide.

9. In the process for the preparation of aminonitrothiazole by the neutralization of an aqueous solution of its hydrochloric acid salt, the improvement which comprises neutralizing said aqueous solution to a pH greater than about 2.0 by the addition thereto of ammonium hydroxide.

10. In the process for the preparation of 2-amino-5-nitrothiazole by the neutralization of an aqueous solution of its hydrochloric acid salt, the improvement which comprises neutralizing said aqueous solution to a pH greater than about 2.0 by the addition thereto of ammonium hydroxide.

GEORGE W. STEAHLY.

REFERENCES CITED

The following references are of record in the file of this patent:

Chemical Abstracts, vol. 40, pp. 4056–4060, citing Ganapathi et al., Proc. Indian Acad. Sci., 22A, pages 348–358 (1945).